(12) United States Patent
Johnson

(10) Patent No.: US 7,659,923 B1
(45) Date of Patent: Feb. 9, 2010

(54) ELIMINATION OF BLINK-RELATED CLOSED EYES IN PORTRAIT PHOTOGRAPHY

(76) Inventor: David Alan Johnson, 13044 W. Woodspring St., Boise, ID (US) 83713

( * ) Notice: Subject to any disclaimer, the term of this patent is extended or adjusted under 35 U.S.C. 154(b) by 285 days.

(21) Appl. No.: 11/309,090

(22) Filed: Jun. 20, 2006

Related U.S. Application Data

(60) Provisional application No. 60/595,348, filed on Jun. 24, 2005.

(51) Int. Cl.
- H04N 5/225 (2006.01)
- G03B 17/00 (2006.01)
- G06K 9/00 (2006.01)

(52) U.S. Cl. .................. 348/218.1; 396/51; 382/117
(58) Field of Classification Search .............. 348/78, 348/218.1, 239; 396/18, 51
See application file for complete search history.

(56) References Cited

U.S. PATENT DOCUMENTS

| | | | |
|---|---|---|---|
| 6,345,109 B1 * | 2/2002 | Souma et al. ............ 382/118 |
| 6,895,103 B2 * | 5/2005 | Chen et al. .............. 382/117 |
| 6,898,300 B1 * | 5/2005 | Iwaki ...................... 382/117 |
| 7,084,918 B2 * | 8/2006 | Robins et al. .......... 348/333.03 |
| 7,146,026 B2 * | 12/2006 | Russon et al. ............ 382/117 |
| 2001/0021224 A1 * | 9/2001 | Larkin et al. ........... 375/240.16 |
| 2003/0223635 A1 | 12/2003 | Russon .................... 382/167 |
| 2004/0223649 A1 * | 11/2004 | Zacks et al. .............. 382/218 |
| 2005/0024516 A1 | 2/2005 | Fish ..................... 348/333.03 |

* cited by examiner

Primary Examiner—Kelly L Jerabek

(57) ABSTRACT

A system and method of eliminating closed or partially closed eyes of subject in photography, caused by subjects blinking at the moment of image capture. A digital camera is configured to capture two images in quick succession. The image processing unit of the camera identifies regions of difference between the two images that indicate that eyes are partially or fully closed in one of the two images, and creates a single composite image from the two original images, in which all eyes are open for all subjects in the image.

3 Claims, 3 Drawing Sheets

ELIMINATION OF BLINK-RELATED CLOSED EYES IN PORTRAIT PHOTOGRAPHY

CROSS REFERENCE TO RELATED PATENT APPLICATION

The present application claims priority to U.S. Provisional Application Ser. No. 60/595,348, filed on Jun. 24, 2005, which is incorporated herein by reference.

FIELD OF THE INVENTION

The present invention relates to digital photography, and in particular, to the image processing algorithms which improve the quality of the captured image.

BACKGROUND OF THE INVENTION

In portrait photography, one or more subjects may be blinking at the moment that the image is captured. This results in a sub-optimal image where one or more of the subjects have partially or fully closed eyes. To improve the chances of a better picture, photographers often capture several images within a few seconds of each other, hoping that all subjects have open eyes in at least one captured image. This method requires extra time and effort on the part of the photographer as well as the subjects.

Several inventions in digital photography have also been disclosed which use image processing algorithms to interrogate a captured image in order to detect and warn the photographer that one or more eyes are not fully open. This gives the photographer the opportunity to capture additional images in the attempt to capture at least one image where all eyes are fully open. Still other inventions have been disclosed which provide a means of fixing the image at some later date.

A preferred solution, would allow the subjects to pose for a single image capture event, and would automatically provide the photographer with a single image that has been adjusted to ensure that all the eyes are open.

SUMMARY OF THE INVENTION

A digital camera is configured to capture two images in quick succession. The time delay between the two captured images is chosen to be short enough to ensure that the composition of both pictures is nearly identical, but long enough to ensure that closed eyes associated with a normal blink will be absent in at least one of the two images. Various sources cite a typical duration of a human blink to be between 75 and 250 milliseconds. The time delay between the first and second image is chosen to be just longer than the longest anticipated blink duration. An algorithm is used to compare the characteristics of the first image to the characteristics of the second image. The algorithm produces one of the three possible outcomes:

1) keep the first image as the final image, and discard the second image.
2) keep the second image as the final image, and discard the first image.
3) blend the two images together to create a third preferred image as the final image, and discard the first and second images.

BRIEF DESCRIPTION OF THE DRAWINGS

The present invention will become more fully understood from the detailed description and the accompanying drawing, wherein.

DETAILED DESCRIPTION OF THE INVENTION

Figure 1:
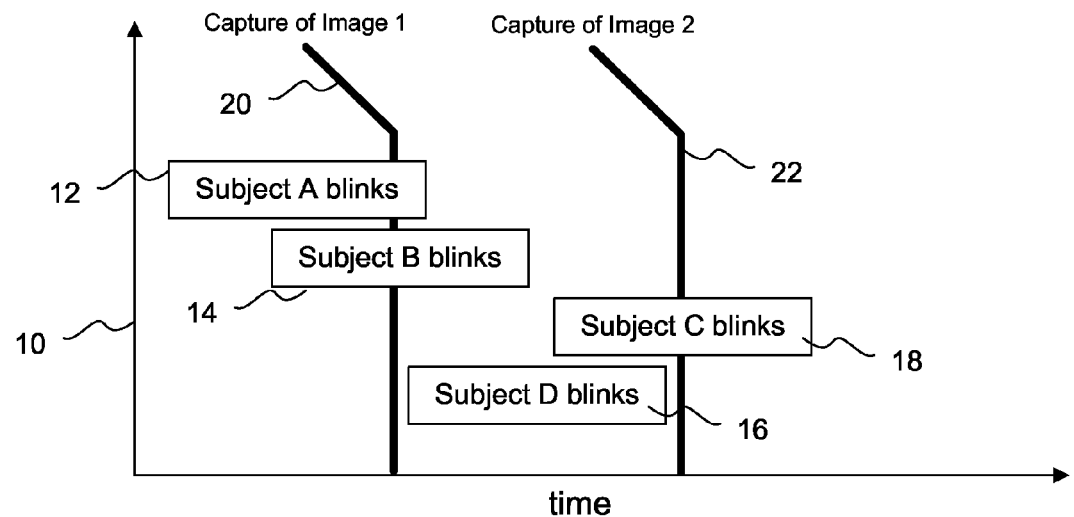
FIG. 1 is a timing diagram that illustrates how the two image capture events relate to the blinking patterns of several subjects.

To illustrate the invention, a specific case is presented in detail. In FIG. 1, the timing diagram 10 shows a sequence of events that happens during the time that a camera (not shown) is capturing an image of several subjects 26. The camera is configured to automatically capture two images in quick succession when the shutter release button (not shown) is activated. At the time that first image is captured 14 Subject A 12 and Subject B 14 are both blinking. A specified period of time passes before the second image is captured 22. The time between capture events is designed to be just longer than the longest expected time it takes for the subjects to blink. Note that Subject D initiates and completes a blink cycle 16 in the time between the capture of the first image 20 and the capture of the second image 22. During the capture of the second image 22 Subject C 18 is blinking.

Figure 2:
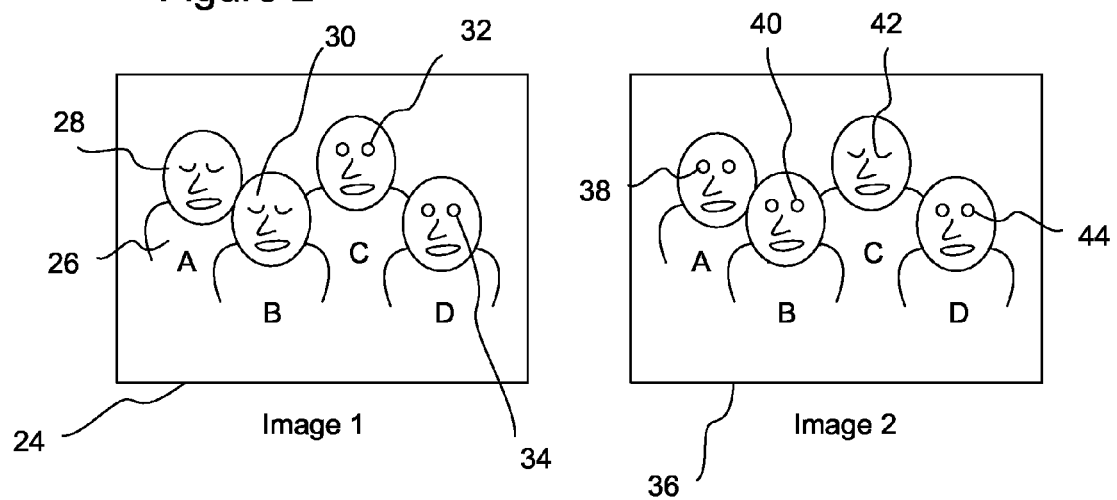
FIG. 2 is an example of what the first and second images would look like for the case described in FIG. 1.

FIG. 2 is a depiction of the two captured images corresponding to the events of FIG. 1. The first image 24 shows that the eyes of subject A 28 and the eyes of Subject B 30 are closed, while the eyes of Subject C 32 and Subject D 34 are open. The second image 36 shows that the eyes of Subject A 38 and the eyes of Subject B 40 are now open. Subject D's eyes 44 are also open, though this subject did blink between the two image capture events. In the second image 36, the eyes of subject C 42 are closed. Neither the first image 24 or the second image 36 are preferred, due to the closed eyes in each image. However, by combining content from both images, a preferred image can be created.

Figure 3:
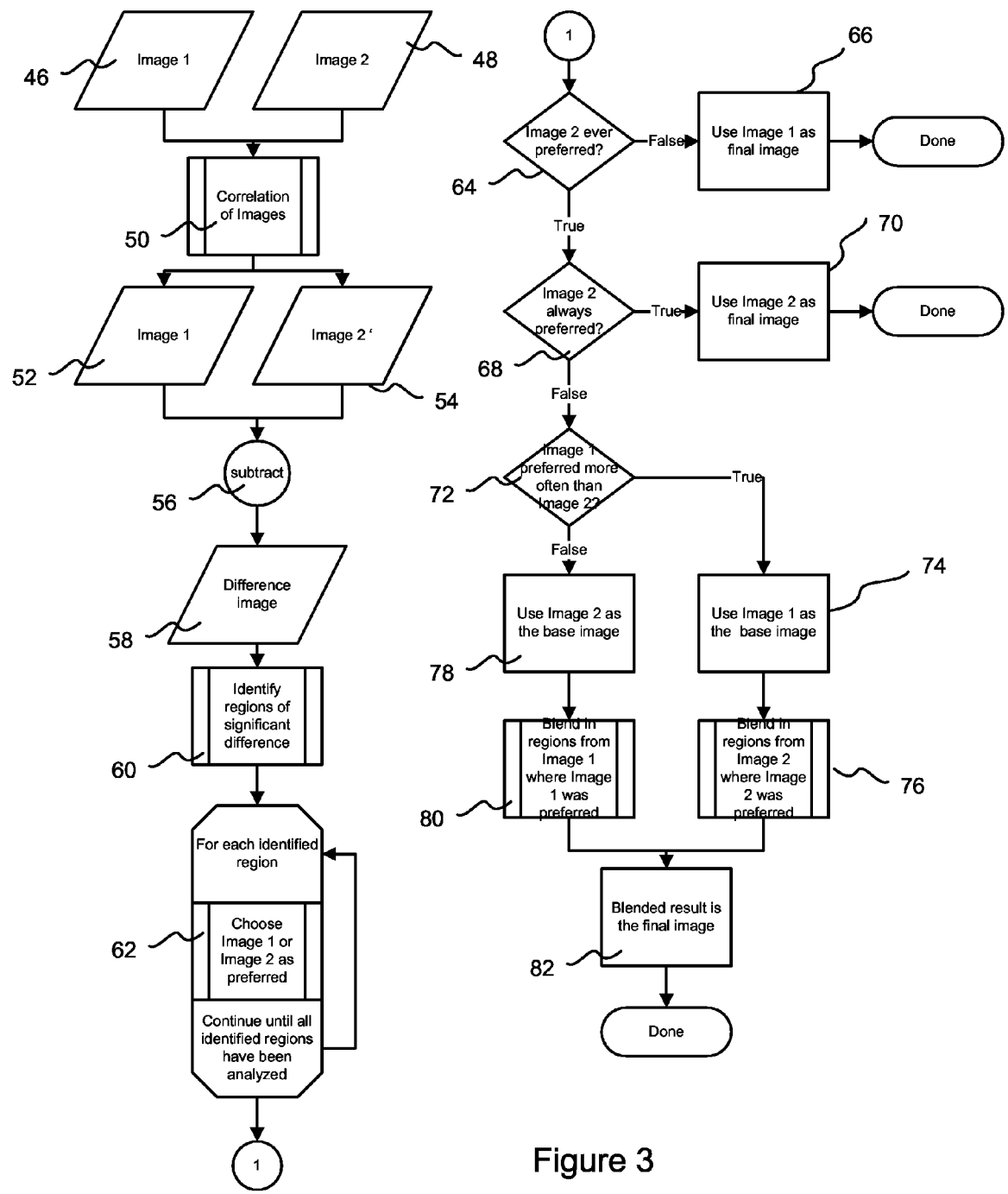
FIG. 3 is a flow chart that describes the decision steps and algorithm that lead to the final image.

FIG. 3 is a flow chart that describes the image analysis, decision and image processing steps. The first image 46 and second image 48 are correlated 50, which creates a modified version of the second image 54. The correlation step 50 uses known image processing techniques to align the image content from the second image 48 to best match the content of the first image 46. Typically, this includes two dimensional Fourier transforms to determine how to stretch, skew, translate and rotate the second image 48 until it best aligns with the first image 46. This step accounts for movement of the camera or the subjects that may have taken place between the capture of the first image 46 and the second image 48. One image is then subtracted from the other 56, which creates a new image 58 that contains only the differences between the first image and the modified second image. An algorithm 60 is applied to the difference image 58 in order to identify regions that have significant differences that also conform to the characteristics associated with differences between open eyes, and eyes that are fully or partially closed. For each region that matches the criteria, another algorithm 62 chooses one preferred rendition from among the first image 46 and the second image 48. The system notes the location of each region that was deemed significant, and for each region, whether the preferred rendition comes from the first image 46 or the second image 48.

The algorithm then determines how to create a final image. At the next decision step 64 if regions of the second image 48 are never preferred over the first image 46, then either there were no regions of significant difference, or if there were such regions, the first image 46 was preferred in all cases. In this situation, the first image 46 is retained as the final image, without any modifications 66, the second image 48 is discarded, and the algorithm is done. Otherwise, if there was at least one instance where a region of the second image 48 was preferred, then the algorithm moves to the next decision step 68, which determines if the second image 48 was always preferred. If true, then the second image 48 is retained as the final image, without modification 70, the first image 46 is discarded and the algorithm is done. If this is false, then the final image will be created by blending together elements of both images.

The next step 72 determines which image was preferred more often. If the first image 46 was preferred more often than the second image 48, then the first image 46 is used as a base image 74, and the preferred regions from the second image are blended into the first image 76. This creates a single blended third image 82 which is used as the final image, the first image 46 and the second image 48 are discarded, and the algorithm is done. If the second image 48 is preferred more often, then the second image 48 is used as the base image 78 and the preferred regions from the first image 46 are blended in 80. This creates a single blended third image which is used as the final image 82, and the algorithm is done.

Now we will apply this algorithm to the hypothetical example previously introduced. The step of identifying regions of significant difference between the first image 24 and the second image 36, identifies 6 different regions to consider. These regions are the two eyes for each of three subjects: Subject A 28 vs. 38, Subject B 30 vs. 40, and Subject C 32 vs. 42. These six regions are selected, because the difference plot includes the characteristics associated with the comparison of open and closed eyes. The preference step 62 chooses the second image as the source for four of these regions (two eyes of Subject A 38, and two eyes of Subject B 40). The preference step 62 chooses the first image as the source for the remaining two regions (two eyes of Subject C 32). Since both images are preferred sources for one or more regions, the final image is generated by blending. Since the second image is preferred more often than the first image, the second image is used as the base image 78, and the preferred regions of the first image (the two eyes of subject C 32) are blended into the base image to create the blended final image 82.

Figure 4:
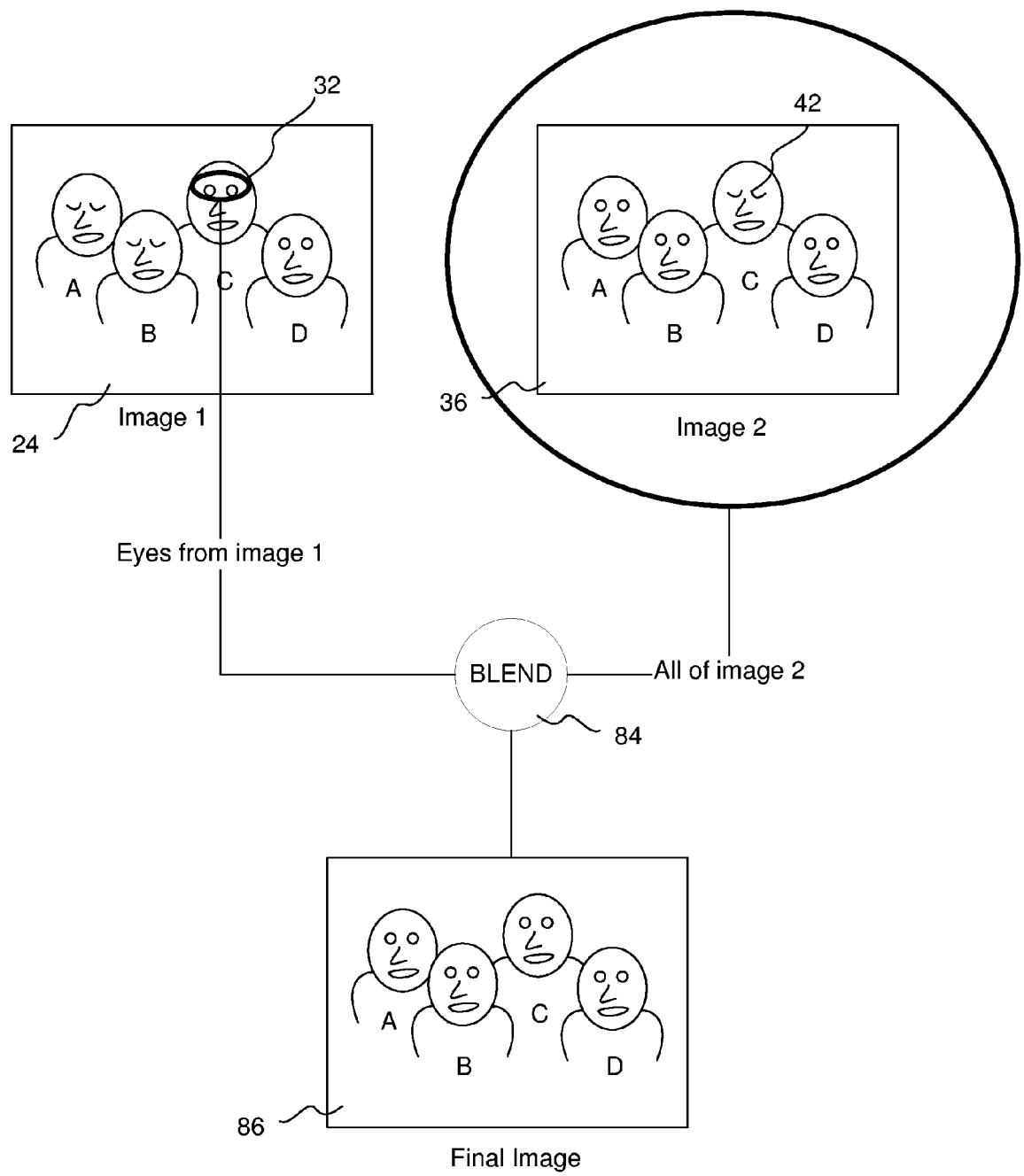
FIG. 4 demonstrates how the two images from FIG. 2 are combined to create a third preferred image, which is kept as the final image.

FIG. 4 is a graphical representation of the blending operation. The region of each eye from Subject C 32 is blended 84 into the content of the second image 36, which effectively replaces the closed eyes of Subject C 42, creating a single final image 86 where all subjects have open eyes.

Note that the region preference algorithm 62 will provide an optimal result even when neither the first image 24 or the second image 36 have captured a fully open eye. The algorithm will select the region from the image that has the most open eye, which is the best possible result, given the information available.

On occasion, the image analysis portion of the algorithm may incorrectly classify a region of difference as being associated with closed and open eyes, when in reality, the region of difference was caused by some other change in the scene. In this case, the subsequent blending operation will cause a change to a non-eye portion of the final image. However, because the blended elements come from two images that are already nearly identical, such false positives do not adversely affect the resultant final image. Since false positives do not significantly detract from the final results, this allows the analysis and classification portion of the algorithm to be simplified and thresholds functions set to be aggressive in selecting regions of difference that are candidates for blending.

If the correlation of images step 50 does not return a sufficiently well correlated image pair, then the first and second images are too different from each other for a blending algorithm to work effectively. The blending process is aborted, and one of the two images is retained as the final image. Alternatively, both images may be retained as two separate images.

Although the present invention has been described and illustrated in detail. It is clearly understood that the same is by way of illustration and example only and is not to be taken by way of limitation, the spirit and scope of the present invention being limited only by the terms of the appended claims.

ALTERNATE EMBODIMENTS

The image correlation step 50 may also include face and/or eye recognition processing, and may limit analysis and correlation and subsequent operations to just those area identified as faces and/or eyes.

The preference algorithm can be configured to improve the probability of selecting both eyes of a subject from the same image. This may be associated with a face recognition program, or other spatial analysis method that identifies when two eyes likely belong to the same subject.

The identification of regions of interest 60, and the preference selection step 62 may be configured to identify and make preference choices in more difficult situations, such as when eyes are only partially open in one or both images.

Three or more images may be captured, and the preferred image created as a composite of all captured images. This improves the chances of producing a single image with all eyes open. However, there is an increased risk of an unsatisfactory result when candidate images are collected over longer periods of time, as this allows for greater actual changes in the captures scenes, such as movement of subjects, movement of the camera, changes in background, and so forth.

The time delay between the first image and the second image may be adjustable by the user, through manipulation of the user interface of the camera.

DETAILED DESCRIPTION OF PREVIOUS ART AND COMPARISON TO THE PRESENT INVENTION

In patent application 20050024516 (2005), Fish et. al. describes a digital camera system that identifies closed eyes and provides remedies for the problem. Fish's automated solution fall short of the benefits of the current invention's teaching as follows:

In one embodiment Fish's solution uses 4 or more images, performs eye analysis independently on each image that requires analysis, and does not account for more than one subject in the image. The new invention uses two images, performs eye analysis by correlation of the two images, and accounts for multiple subjects in the portrait.

In another embodiment, Fish includes a manual step where the user "provides or otherwise inputs an indicator of the target subject" prior to capturing one or more images of the subject. Each captured images is analyzed for open eyes. Those images that are deemed to have closed eyes are improved by blending in portions of previous images that have open eyes. The teaching is difficult to follow, so it is unclear what is meant by "an indicator of the target subject".

However, it appears that there is a significant time delay between the capture of the source image with open-eyes, and the capture of the image with closed closed-eye. It is unlikely that a satisfactory blending can be achieved, when sufficient time has passed between the images, that the position, orientation, lighting or expression of a subject could change significantly.

The new invention has no manual step prior to capturing an image, and requires no "indicator of the target subject". The analysis of whether eyes are open or closed is not a binary function, and is done through correlation and comparison between two images. The images are captured at an optimal time spacing which maximizes the likelihood of every eye being open in at least one picture, but with a sufficiently short time delay between pictures to allow a blended image to look natural.

Only one embodiment from the Fish reference teaches how to accommodate multiple subjects in a single image. Fish requires facial detection algorithms, and a means of dividing the image into regions with only one face located in each region. A complete image is created from multiple images by stitching together one selected copy of each region. The selected copy for each region is chosen based on the eye analysis algorithm determining that the eye(s) are open in that copy. Fish provides no teaching on what to do if all candidate images all have closed or partially opened eyes.

In contrast, the new invention only requires two images, and does not require a regional stitching function. The new invention chooses the best eyes based on a comparison between the two images. This is a much simpler and reliable system compared to algorithms that must specifically identify eyes in any given image. The two images to be blended are captured in quick succession, which minimized the differences between the images, and makes it much easier to perform a direct comparison between the two images. A general purpose image comparison approach is much simpler and reliable than applying a complex special purpose closed-eye recognition algorithm. The new invention also easily accommodates making the best choice between the two candidates. Since the images are captured in quick succession, the two images are closely correlated, which makes it much easier to blend the two images into a single image.

In summary, the new invention is a significant improvement over Fish in the following areas:
  does not require any special steps by users;
  operates on just two images;
  works for multiple subjects in a single image;
  is virtually indistinguishable in operation from a typical image capture experience, both for the user and the subjects;
  is inherently optimized for correlation and blending by virtue of the fact that the two images are taken in quick succession;
  selects the better representation of the eyes through simple comparison of two images, which are otherwise nearly identical;
  does not rely on a complex and fault-prone face and eye recognition analysis to determine regions of interest.

In patent application 20030223635, Russon describes a method of solving the problem of closed eyes in photography. Russon's method involves detecting closed eyes in an image, finding a suitable replacement eye that comes from a library of open eye images, and blending of the image of the open eye into the original image. This operation is performed as a post-processing step at some time after the closed-eye image is captured.

The new invention improves upon Russon in the following ways:

All operations happen in the camera, without any user intervention or post-processing steps.

There is no need to maintain a library of open eye images.

The substituted image of the open eye comes from the specific subject, captured immediately before or after the image into which it is blended, not from a standard library. The blending operation is much easier, as the open eye image is well correlated to the closed-eye image.

What is claimed is:

1. A method comprising:
   capturing a first digital image and a second digital image in quick succession, thereby recording similar image information, and comparing the image data of the first digital image to the image data of the second digital image to identify a plurality of regions of significant difference between the first digital image and the second digital image; and
   for each of the plurality of identified regions:
      determining if the second digital image contains a preferred rendition of that identified region;
      if the second digital image contains the preferred rendition, blending that identified region from the second digital image into that identified region of the first digital image; and
   if the second digital image does not contain the preferred rendition, retaining that identified region in the first digital image,
   wherein comparing comprises:
      subtracting the image data of one of the first and second digital images from the image data of the other of the first and second digital images to create a third digital image representing the difference between the first and second digital images; and
      applying an algorithm to the third digital image to identify the plurality of regions of significant difference, wherein the identified plurality of regions conform to characteristics associated with differences between open eyes and eyes that are closed or partially closed.

2. The method of claim 1 further comprising prior to comparing, transforming one of the first and second digital images to improve alignment between corresponding objects of the first and second digital images.

3. A method of blending elements of a plurality of images to create a preferred final image, comprising:
   capturing a plurality of digital images in quick succession, thereby recording similar image information in each image, the plurality of images including a first digital image and a remainder of the plurality of digital images;
   applying a first algorithm to transform each one of the remainder of the plurality of digital images to improve alignment between corresponding objects of that one of the remainder of the plurality of digital images and the first digital images;
   for each one of the remainder of the plurality of digital images:
      applying a second algorithm to compare the image data of the first digital image to the image data of that one of the remainder of the plurality of digital images to identify a plurality of regions of significant difference between the first digital image and that one of the remainder of the plurality of digital images; and
      for each of the plurality of identified regions:
         applying a third algorithm to determine if that one of the remainder of the plurality of digital images contains a preferred rendition of that identified region;

if that one of the remainder of the plurality of digital images contains the preferred rendition, applying a fourth algorithm to blend that identified region from that one of the remainder of the plurality of digital images into that identified region of the first digital image; and if that one of the remainder of the plurality of digital images does not contain the preferred rendition, retaining that identified region in the first digital image, wherein applying the second algorithm comprises applying the second algorithm to:

subtract the image data of the first digital image from the image data of that one of the remainder of the plurality of digital images to create a third digital image representing a difference between the first and second digital images; and examine the third digital image to identify the plurality of regions of significant difference, wherein the plurality of regions of significant difference conforms to characteristics associated with differences between open eyes and eyes that are closed or partially closed.

* * * * *